United States Patent
Cadoret et al.

(10) Patent No.: US 9,648,885 B2
(45) Date of Patent: May 16, 2017

(54) HEAT TREATMENT DEVICE, IN PARTICULAR FOR SAUSAGES

(71) Applicant: ARMOR INOX, Mauron (FR)

(72) Inventors: Bernard Cadoret, Mauron (FR); Olivier Marquet, Mauron (FR)

(73) Assignee: Armor Inox, Mauron (FR)

( * ) Notice: Subject to any disclaimer, the term of this patent is extended or adjusted under 35 U.S.C. 154(b) by 594 days.

(21) Appl. No.: 14/053,738

(22) Filed: Oct. 15, 2013

(65) Prior Publication Data

US 2014/0102314 A1    Apr. 17, 2014

(30) Foreign Application Priority Data

Oct. 16, 2012 (FR) .................... 12 59842

(51) Int. Cl.

| | |
|---|---|
| *A47J 27/00* | (2006.01) |
| *A23P 1/00* | (2006.01) |
| *A23L 1/00* | (2006.01) |
| *A22C 11/00* | (2006.01) |
| *A23P 30/25* | (2016.01) |
| *A23L 5/10* | (2016.01) |
| *A23L 13/60* | (2016.01) |

(52) U.S. Cl.
CPC ............ *A22C 11/00* (2013.01); *A22C 11/001* (2013.01); *A23L 5/13* (2016.08); *A23L 13/65* (2016.08); *A23P 30/25* (2016.08)

(58) Field of Classification Search
CPC .... A47J 37/0694; A47J 37/048; A47J 37/049; A47J 43/18; A22C 11/001
USPC .................... 99/441, 426–440, 442
See application file for complete search history.

(56) References Cited

U.S. PATENT DOCUMENTS

| | | | | |
|---|---|---|---|---|
| 1,488,698 A | * | 4/1924 | Mumm | A22C 17/14 |
| | | | | 138/118.1 |
| 1,662,532 A | * | 3/1928 | Mennillo | A23L 3/22 |
| | | | | 426/475 |
| 1,992,270 A | * | 2/1935 | Wilkes | A47J 37/0864 |
| | | | | 219/242 |

(Continued)

FOREIGN PATENT DOCUMENTS

| | | |
|---|---|---|
| FR | 2692443 A1 | 12/1993 |
| WO | 2011107496 A1 | 9/2011 |

*Primary Examiner* — David Angwin
*Assistant Examiner* — Gyounghyun Bae
(74) *Attorney, Agent, or Firm* — Bachman & LaPointe, P.C.

(57) ABSTRACT

A heat-treatment device in particular for sausages of the co-extruded sausage type, has pipework extending between an introduction orifice and a discharge orifice through which the sausages emerge from the pipework a collecting device that is disposed above the introduction orifice, which emerges in the pipework at the introduction orifice and is intended to enable the sausages to be introduced into the pipework a pump intended to propel hot water into the pipework upstream of the introduction orifice or in the collecting device the water level in the collecting device being higher than the level of the discharge orifice and the level of the introduction orifice the level of the introduction orifice is lower than the level of the top part of the coil, and the pipework has between the introduction orifice and the discharge orifice, a part taking the form of a coil in a descending spiral, and between the introduction orifice and the coil an ascending portion.

7 Claims, 3 Drawing Sheets

(56) References Cited

U.S. PATENT DOCUMENTS

| | | | | |
|---|---|---|---|---|
| 3,769,028 | A * | 10/1973 | Katz | A23L 3/001 426/232 |
| 4,006,258 | A * | 2/1977 | Vaessen | A22C 17/14 426/140 |
| 4,010,734 | A * | 3/1977 | Chayet | F24D 11/003 126/587 |
| 4,069,308 | A * | 1/1978 | Tanaka | A01M 1/2061 422/27 |
| 4,084,492 | A * | 4/1978 | Sullivan | A47J 27/18 137/393 |
| 4,589,955 | A * | 5/1986 | Nukala | B01D 35/185 196/114 |
| 4,660,542 | A * | 4/1987 | Scherer | A47J 27/17 126/348 |
| 4,661,364 | A * | 4/1987 | Campbell | A21C 11/20 222/152 |
| 4,975,309 | A * | 12/1990 | Gord | A22C 13/0013 138/118.1 |
| 5,073,394 | A | 12/1991 | Dake et al. | |
| 5,462,210 | A * | 10/1995 | Kuhlman | A21B 5/06 222/380 |
| 5,532,014 | A * | 7/1996 | Kobussen | A22C 11/10 426/140 |
| 5,843,504 | A * | 12/1998 | Kobussen | A22C 11/008 198/493 |
| 5,997,931 | A | 12/1999 | Askman et al. | |
| 6,322,832 | B1 * | 11/2001 | Schiffmann | A21B 2/00 426/238 |
| 6,988,943 | B2 * | 1/2006 | Reutter | A22C 13/0003 452/40 |
| 7,913,654 | B2 * | 3/2011 | Celis | C01B 3/042 123/1 A |
| 8,597,918 | B2 * | 12/2013 | Clark | C07C 29/76 435/132 |
| 2002/0172750 | A1 * | 11/2002 | Nelles | A01J 25/008 426/582 |
| 2004/0237557 | A1 * | 12/2004 | Harmon | F24H 1/181 62/238.6 |
| 2006/0199485 | A1 * | 9/2006 | Braig | A22C 11/0245 452/32 |
| 2008/0163638 | A1 * | 7/2008 | Broadbent | F25C 1/12 62/340 |
| 2008/0220138 | A1 * | 9/2008 | Dallagnol | A23B 9/02 426/523 |
| 2012/0079951 | A1 * | 4/2012 | Nehls | A23L 3/02 99/536 |

* cited by examiner

HEAT TREATMENT DEVICE, IN PARTICULAR FOR SAUSAGES

BACKGROUND

The present invention concerns a device for the heat treatment of small products and in particular sausages.

The invention is particularly suitable in the context of co-extruded sausages. Such sausages comprise a core of food products and an external film consisting of a gel, for example of the alginate or collagen type.

Such sausages are produced continuously and cut to length before heat treatment. They may also be produced in a string without separation from one another.

For the sausage thus cut to hold together, it passes through a stream of hot water so as to stabilise the gel and coagulate the surface proteins.

The sausage thus solidified on the surface can then be handled more easily without risk of deterioration of its surface appearance.

The document U.S. Pat. No. 5,997,931 and the document WO-A-2011/107496 disclose heat-treatment devices.

SUMMARY

One object of the present invention is to propose a device for the heat treatment of sausages that does not have the drawbacks of the prior art and in particular facilitates production of sausages in large quantities by optimising the cooking yields.

To this end, a heat-treatment device is proposed, in particular for sausages of the co-extruded sausage type, said heat-treatment device comprising;
  pipework extending between an introduction orifice and a discharge orifice through which the sausages emerge from the pipework,
  a collecting device that is disposed above the introduction orifice, which emerges in the pipework at the introduction orifice and is intended to enable the sausages to be introduced into the pipework,
  a pump intended to propel hot water into the pipework upstream of the introduction orifice or in the collecting device,
  the water level in the collecting device being higher than the level of the discharge orifice and the level of the introduction orifice,
  the level of the introduction orifice is lower than the level of the top part of the coil,
  the pipework comprising, between the introduction orifice and the discharge orifice, a part taking the form of a coil in a descending spiral, and between the introduction orifice and the coil an ascending portion.

Advantageously, the ascending part has injection nozzles disposed so as to direct their jet upwards.

Advantageously, the heat-treatment device comprises an air purge system disposed on the pipework at its highest point.

Advantageously, the heat-treatment device comprises a regulation system comprising means for measuring the water level in the collecting device and means for controlling the output of the pump according to the level information supplied by said level-measurement means.

Advantageously, the heat-treatment device comprises filling pipework connected to the pipework between the coil and the introduction orifice through a valve.

Advantageously, when the water coming from the pump is introduced into the pipework upstream of the introduction orifice, the heat-treatment device comprises a valve fitted at the base of the collecting device above the introduction orifice.

Advantageously, the diameter of the pipework is greater than the length of the sausages by at least 10%.

BRIEF DESCRIPTION OF THE DRAWINGS

The features of the invention mentioned above, as well as others, will emerge more clearly from a reading of the following description of an example embodiment, said description being given in relation to the accompanying drawings, among which.

DETAILED DESCRIPTION

Figure 1:
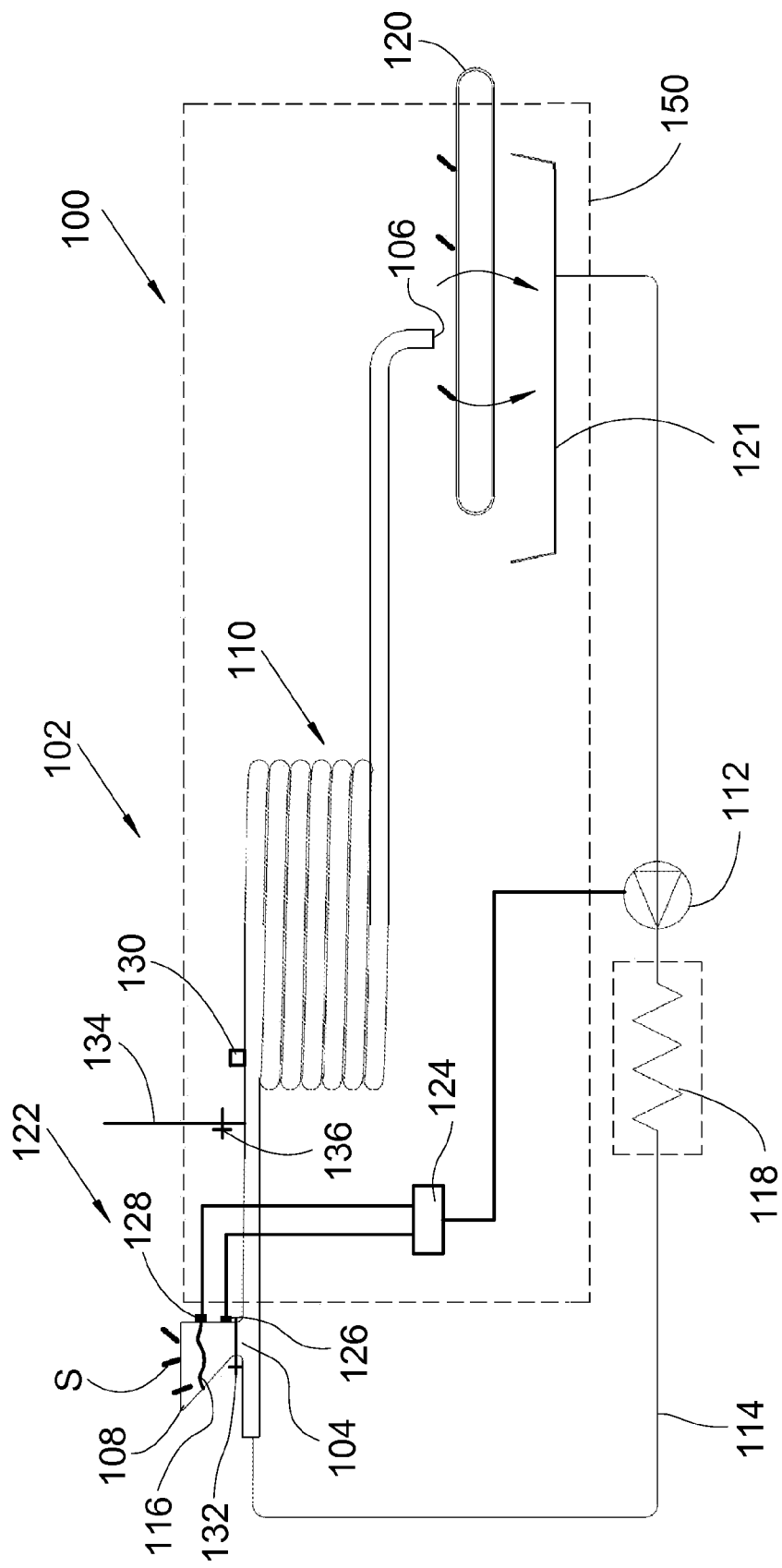
FIG. 1 shows a device for the heat treatment of sausages.
Figure 2:
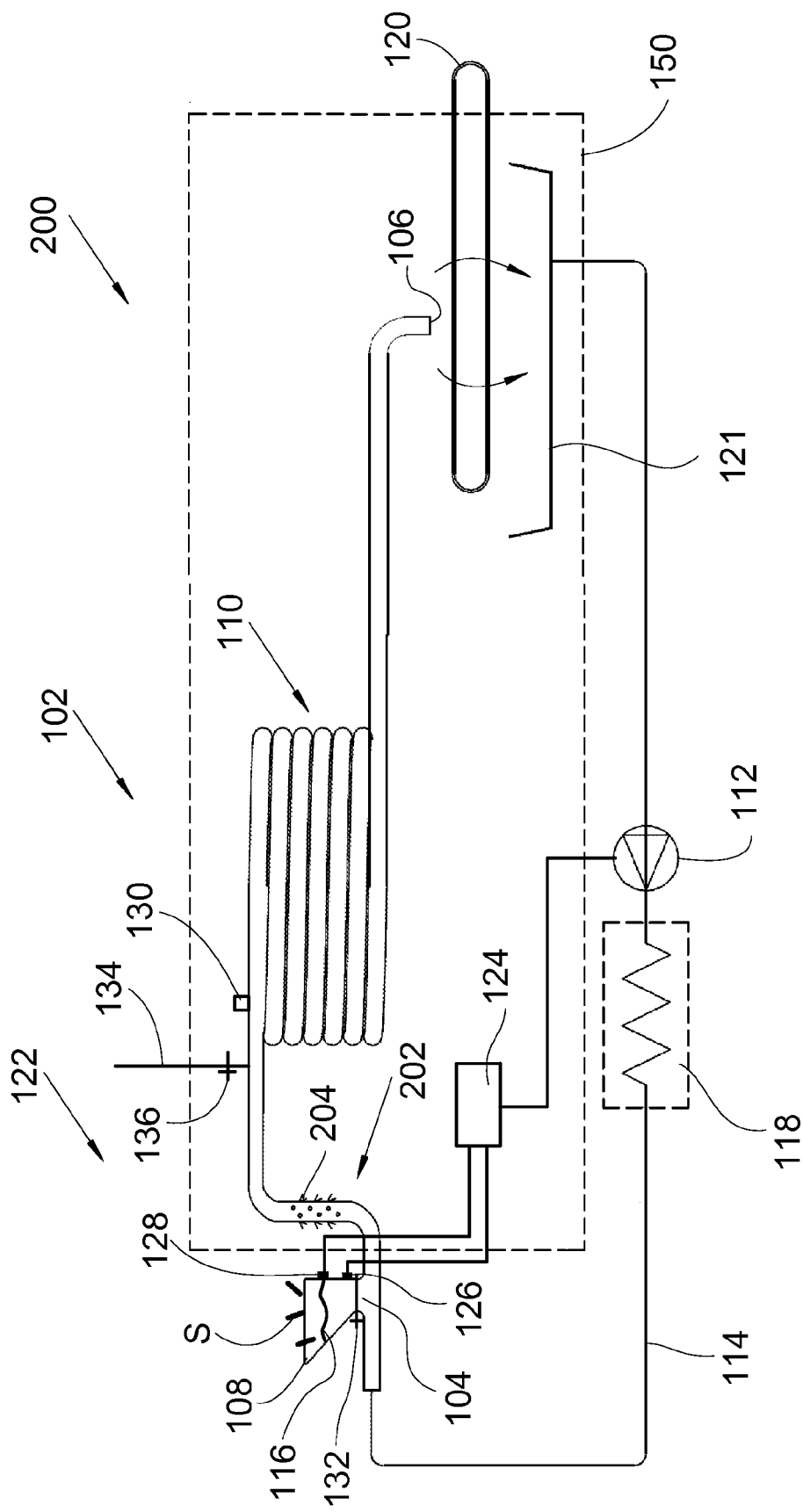
FIG. 2 shows a device for the heat treatment of sausages according to an embodiment of the invention.

In the following description, the terms relating to a position are taken with reference to a device for the heat treatment of sausages disposed in the functioning position, that is to say as shown in FIG. 1 and FIG. 2. For example, the concept "upstream" refers to the direction of progression of the water in the heat-treatment device.

FIG. 1 shows a heat-treatment device 100 for sausages S of the co-extruded sausage type with an external gel film, of the alginate or collagen type.

The heat-treatment device 100 comprises pipework 102 that extends between an introduction orifice and a discharge orifice 106.

The introduction orifice 104 is surmounted by a collecting device 108 that is here in the form of a cone that emerges in the pipework 102 at the introduction orifice 104 and is intended to receive the sausages S, which, as explained below, are entrained in the pipework 102.

Figure 3:
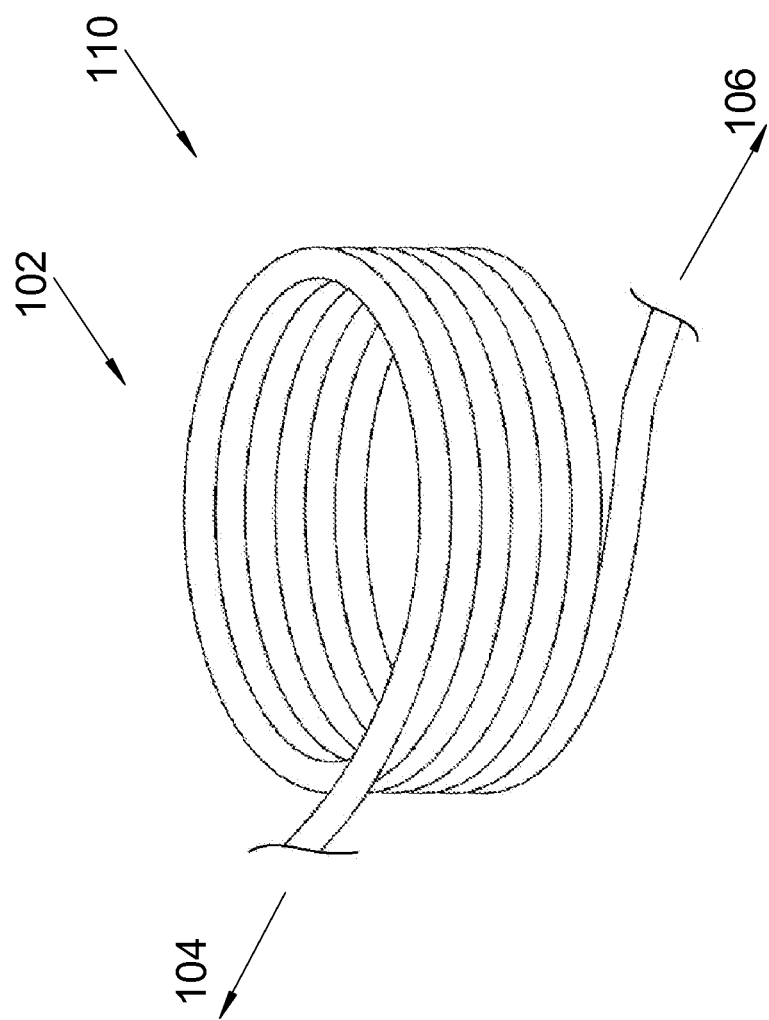
FIG. 3 shows a detail of a heat-treatment device according to the invention.

FIG. 3 shows a detail of the pipework 102. Between the introduction orifice 104 and the discharge orifice 106, the pipework 102 comprises a part taking the form of a coil 110 in a descending spiral. The coil 110 consists of a coil around a vertical axis and descending between its starting point and its arrival point.

Such a coil affords a saving in space compared with straight pipework. Naturally the coil 110, which is here circular in FIG. 3 for reasons of ease of use, may take a different form. For example, each turn may be elongated horizontally and take a form close to an ellipse or a rectangle.

To entrain the sausages S, the pipework 102 is supplied with water by a pump 112 that propels the water through an introduction pipe 114 that emerges in the pipework 102 upstream of the introduction orifice 104 or in the collecting device 108.

To ensure the entrainment of the water in the coil 110, the water level 116 in the collecting device 108 is higher than the level of the discharge orifice 106 and the level of the introduction orifice 104.

To heat the sausages S, the water is heated by heating means 118 of the heat exchanger type, which is here disposed between the pump 112 and the pipework 102. The water used preferably comes from recirculation.

The functioning of the heat-treatment device 100 is as follows. The water that fills the pipework 102 and the collecting device 108 is driven by gravity in the coil because of the difference in height between the water level 116 in the collecting device 108 and the discharge orifice 106, the sausages S that are introduced into the collecting device 108 are entrained with the water and emerge through the discharge orifice 106 after having undergone the heat treatment due to the immersion in the hot water in the coil 110.

At the discharge orifice 106, the water and sausages S emerge from the pipework 102. The sausages S fall onto a reception means such as for example a belt conveyor 120 and the water flows through the belt conveyor 120 in order to be recovered here by means of a recovery means 121 disposed under the reception means and returned to the pump 112 in order to recirculate the water. The sausages S that fall onto the belt conveyor 120 are next directed to a subsequent processing station.

The length of the coil 110, the difference in height between the water level 116 in the collecting device 108 and the discharge orifice 106, and the output of the pump 112 are calculated according, among other things, to the required production rate of the sausages S and the residence time necessary for the heat treatment of said sausages S in the coil 110.

In the embodiment in FIG. 1, the level of the introduction orifice 104 is identical to or higher than the level of the top part of the coil 110.

FIG. 2 shows a heat-treatment device 200 according to another embodiment of the invention. The general functioning is identical to that of the first embodiment of the invention and the elements that are identical to those of FIG. 1 keep the same reference.

In the embodiment of the invention in FIG. 2, the level of the introduction orifice 104 is lower than the level of the top part of the coil 110 while remaining higher than the level of the discharge orifice 106. Such an installation makes it possible to reduce the height of introduction of the sausages into the collecting device 108.

To enable the water to reach the coil 110, the pipework 102 comprises, between the introduction orifice 104 and the coil 110, an ascending portion 202.

To assist the ascension of the sausages S in the ascending portion 202, injection nozzles 204 may be disposed in the ascending part 202 so as to direct the jets that are expelled therefrom upwards and inside the ascending portion 202. The jets may for example be steam or water jets preferably coming from recirculation.

In a particular embodiment of the heat-treatment device 200 of FIG. 2, for sausages 120 mm long, with water at 90° C. and a pump outputting 60 m³/h, the heat treatment device 200 has the following features:
- the pipework 102 has a diameter of 150 mm,
- the height between the water level 116 in the collecting device 108 and discharge orifice 106 is around 300 mm,
- the coil 110 has a length of approximately 60 metres for a residence time of approximately 1 minute. To avoid blockage of the pipework 102 of the heat-treatment devices 100 and 200, the diameter of the pipework 102 is greater than the length of the sausages S by at least 10%.

To limit heat losses, the coil 110, the reception means 120 and the recovery means 121 are disposed inside a thermally insulating cabinet 150 or a thermally insulated vessel.

To prevent air being introduced into the pipework 102, the collecting device 108 must always contain sufficient water for the introduction orifice 104 to be under the water level. To this end, the heat-treatment device 100, 200 comprises a regulation system 122 that comprises means for measuring the water level in the collecting device 108 and means for controlling the output of the pump 112 according to the level information supplied by said level-measuring means.

The means for controlling the output of the pump take the form of a control unit 124, and the means for measuring take the form of a low-level sensor 126 and high-level sensor 128 or a similar level sensor. The low-level sensor 126 makes it possible to detect when water in the collecting device 108 reaches a minimum level and the high-level sensor 128 makes it possible to detect when the water in the collecting device 108 reaches a maximum level.

The control unit 124 receives the information delivered by the sensors 126 and 128 and controls the pump 112 in the following manner. When the water reaches the low-level sensor 126, the control unit 124 demands the acceleration of the pump 112 in order to increase the output of water and when the water reaches the high-level sensor 128 the control unit 124 demands the slowing of the pump 112 in order to reduce the water output.

To prevent the water being able to interfere with the flow of water and sausages S in the coil 110, an air-purge system 130 is disposed on the pipework 102 at its highest point.

The heat-treatment devices 100 and 200 are easy to clean. This is because it suffices, after the supply of sausages S at the collecting device 108 is stopped, to drain the heat-treatment device 100, 200 and to introduce a cleaning solution instead. This cleaning solution then circulates in closed circuit throughout the whole of the heat-treatment device 100, 200.

When the water coming from the pump 112 is introduced into the pipework 102 upstream of the introduction orifice 104, the heat-treatment device 100, 200 advantageously comprises a valve 132 placed at the base of the collecting device 108 above the introduction orifice 104. To fill the coil 110 when the heat-treatment device 100, 200 is brought into service, the valve 132 is closed and the water coming from the pump 112 then fills the coil 110. When the coil 110 is filled, the valve 132 can be opened and, as long as water arrives at the introduction orifice 104, the coil 110 remains filled.

The coil 110 can also be filled by means of a filling pipe 134 that is connected to the high point of the pipework 102 through a valve 136 that is opened to fill the coil 110 and remains closed afterwards. This filling pipe 134 may also be used in the case where the water coming from the pump 112 is introduced into the pipework 102 upstream of the introduction orifice 104. In the open position, the filling pipe 134 makes it possible for example to make additions of water in the circuit in order to compensate for evaporation or the water entrained by the sausages S.

Naturally the present invention is not limited to the examples and embodiments described and depicted, but is capable of numerous variants accessible to persons skilled in the art.

The invention claimed is:

1. A heat-treatment device for sausages of the co-extruded sausage type, said heat-treatment device comprising:
   sausage holding pipework extending between an introduction orifice and a discharge orifice through which sausages emerge from the sausage holding pipework,
   a sausage collecting device that is disposed above the introduction orifice, which emerges in the pipework at the introduction orifice and is intended to enable the sausages to be introduced into the sausage holding pipework,
   a pump propelling hot water into the sausage holding pipework upstream of the introduction orifice or in the sausage collecting device, a water level in the sausage collecting device being higher than a level of the discharge orifice and a level of the introduction orifice, and the sausage holding pipework comprising, between the introduction orifice and the discharge orifice, a part taking the form of a coil in a descending spiral relative to a flowing direction of the hot water in the descending spiral, and between the introduction orifice and the coil an ascending portion relative to a flowing direction of the hot water;

the level of the introduction orifice being lower than a level of a top part of the coil.

2. The heat-treatment device according to claim 1, wherein the ascending portion has injection nozzles disposed with upwardly directed jets.

3. The heat-treatment device according to claim 1, further comprising an air-purge system disposed on the pipework at a highest point.

4. The heat-treatment device according to claim 1, further comprising a regulation system comprising means for measuring the water level in the collecting device and means for controlling an output of the pump according to level information supplied by said water level-measuring means.

5. The heat-treatment device according to claim 1, further comprising a filling pipe connected to the pipework between the coil and the introduction orifice through a valve.

6. The heat-treatment device according to claim 1, wherein, when the water coming from the pump is introduced into the pipework upstream of the introduction orifice, and wherein the heat-treatment device comprises a valve placed at a base of the collecting device above the introduction orifice.

7. The heat-treatment device according to claim 1, wherein a diameter of the pipework is greater than a length of the sausages by at least 10%.

* * * * *